Patented May 5, 1942

2,282,088

UNITED STATES PATENT OFFICE 2,282,088

CHLORACRYLIC ESTERS

Maxwell A. Pollack, Akron, Ohio, assignor to Pittsburgh Plate Glass Company, Allegheny County, Pa., a corporation of Pennsylvania No Drawing. Application June 12, 1940, Serial No. 340,121

16 Claims. (Cl. 260—83)

This invention relates to esters of $\alpha$-chloracrylic acid and the polymers thereof and to methods of making these materials, and is particularly directed to the unsaturated alcohol esters of chloracrylic acid and their polymers.

In accordance with my invention, I have prepared the unsaturated alcohol esters of $\alpha$-chloracrylic acid and have found that these esters polymerize to form products having very advantageous properties. I have found that, in general, unsaturated alcohol esters of $\alpha$-chloracrylic acid polymerize to form products of high transparency and stability. Various esters such as vinyl, allyl, isopropenyl, methallyl, oleyl, propargyl, cyclohexenyl, ethylallyl, crotyl, chlorocrotyl, chloroallyl, or other alkyl or halogen substituted allyl alcohol or other unsaturated alcohol ester of chloracrylic acid may be prepared and polymerized, if desired, to form valuable resinous products. These esters may be polymerized to form insoluble, infusible polymers, insoluble fusible, or soluble, fusible polymers, as desired.

The esters may be prepared in suitable manner, as for example, by esterification of $\alpha$-chloracrylic acid which in turn may be prepared by a convenient process. I have found that $\alpha$-chloracrylic acid and its esters may be prepared in good yield by dehydrochlorinating $\alpha\alpha$- or $\alpha\beta$-dichloropropionic acid and esterifying the resulting acid or by the dehydrochlorination of the esters of such acids. These acids or esters thereof may be dehydrohalogenated in a suitable manner, for example, by treatment with an alkaline reagent, for example, sodium or potassium hydroxide, to produce the corresponding $\alpha$-chloroacrylic acid or salt or ester of this acid. The preparation of $\alpha$-chloracrylic acid may be satisfactorily carried out by addition of $\alpha\beta$-dichloropropionic acid to an alcoholic solution of an alkali hydroxide such as potassium or sodium hydroxide. This treatment results in the formation of a quantity of an alkali metal chloride which may be removed, if desired, in a convenient manner. Since it is found that the removal of this compound increases the yield and purity of the product, it is preferably removed. I have found that while hot alcoholic solutions readily dissolve $\alpha$-chloracrylic salts, the inorganic chlorides are not appreciably soluble therein, and thus the latter may be removed by filtration of the heated alcohol solution.

The temperature of dehydrochlorination is preferably, though not necessarily, maintained below room temperature. The dehydrohalogenation of the dichloropropionic acid with alcoholic potassium hydroxide occurs rapidly and it is often advisable, in order to prevent excess dehydrochlorination, to neutralize any excess alkali which may be present, immediately after the addition of the dichloro acid is complete. This neutralization may be effected by any convenient method, as for example, by treatment with carbon dioxide. A substantially pure salt of chloracrylic acid may be obtained from the neutral liquor by filtering and removing alcohol from the filtrate by distillation.

Substantially pure $\alpha$-chloracrylic acid may be secured by acidifying an aqueous solution of this salt by means of a suitable acid such as sulphuric acid, extracting the product with a solvent such as ether, drying the solvent solution and removing the solvent therefrom. The product is obtained as a white crystalline substance which melts at about 60° C.

This acid may be esterified in a suitable manner, as by heating in the presence of the desired alcohol, and an esterification catalyst such as phosphoric acid, sulphuric acid, sulphonic acids, such as toluene-sulphonic acid and the like. The ester may be obtained by fractional distillation of the esterification mixture. Because of the great tendency of these esters to polymerize, it is preferred to carry out this distillation under subatmospheric pressures suitably at a pressure below 300 mm. of mercury and in the presence of a polymerization inhibitor, such as hydroquinone, pyrogallol, aniline, sulphur, resorcinol, etc.

If desired, the $\alpha$-chloracrylic esters may be prepared directly by dehydrochlorination of the corresponding $\alpha\beta$- or $\alpha\alpha$-dichloropropionic ester in much the same manner as the dehydrochlorination of the propionic acid is secured. In this case, it is preferable to avoid the presence of an excess of the alkali hydroxide which would tend to saponify the esters and thereby to reduce the yield. This may be done by slowly adding the alcoholic solution of the alkali to the dichloro ester, preferably in alcoholic solution, using concentrations not substantially in excess of the amount theoretically required. After filtering to remove the precipitated salt as previously described, the ester may be purified by distillation under sub-atmospheric pressure in the manner heretofore mentioned.

The $\alpha$-chloracrylic compounds may also be prepared in other suitable ways such as by dehydrohalogenation of the corresponding dichlorpropionic compounds by vapor phase treatment, with or without the presence of catalysts, such as carbon black, powdered alumina, clays, etc.

The following examples are illustrative:

*Example I.*—A substantial quantity of potassium chloracrylate was prepared as follows: 68.0 parts by weight of α,β-dichloropropionic acid dissolved in 130 parts of methyl alcohol was slowly added to an alcoholic potash solution which contained 78.6 parts by weight of 85% KOH and 400 parts by weight of methyl alcohol. The temperature of the mixture was maintained at 0° C. and a quantity of a white solid material precipitated. The drop in alkali concentration corresponded roughly to the theoretical (2 moles of alkali to 1 of dichloropropionic acid).

After neutralization of the excess alkali by treatment with dry $CO_2$, the mixture was heated to boiling and filtered. In this manner, substantially all the KCl was removed as residue. The filtrate was then evaporated by heating to a temperature not in excess of 70° C. employing reduced pressures as required to remove the alcohol, and the solid residue remaining was substantially pure potassium chloracrylate.

12 parts of potassium chloracrylate as prepared was dissolved in 50 parts of water and treated with 4.3 parts of sulphuric acid at a temperature of 0° C. The solution was extracted twice with ether and the ether extract dried over anhydrous sodium sulphate, filtered and evaporated to leave substantially pure crystalline α-chloracrylic acid.

53 parts of α-chloracrylic acid were dissolved in 45 parts allyl alcohol and to the solution was added 2 parts of $H_2SO_4$. The mixture was refluxed for 3 hours in the presence of a small amount of hydroquinone and distilled under subatmospheric pressure. The distillate was washed with a saturated aqueous calcium chloride solution to remove the alcohol, and dried over anhydrous calcium chloride. After filtering, the dried filtrate was distilled through a fractionating column at an absolute pressure of 11 mm. of mercury. The fraction, boiling at 56–57° C., was found to be substantially pure monomeric allyl alpha chloracrylate.

*Example II.*—58 parts of chloracrylic acid as prepared in Example I, were dissolved in 72 parts of methallyl alcohol and to the solution was added 2 parts of $H_2SO_4$ and a small quantity of hydroquinone. The mixture was refluxed for 3 hours and distilled at an absolute pressure of 18 mm. of mercury. The fraction which boiled at 70°–75° C. was substantially pure methallyl chloracrylate.

*Example III.*—50 parts of alpha chloracrylic acid were dissolved in 65 parts of crotyl alcohol and treated with 3 parts of $H_2SO_4$. The mixture, after refluxing for 4 hours, was distilled at a pressure of 15 mm. of mercury and the crotyl alpha chloracrylate separated by fractionation.

The chloracrylates polymerize with remarkable ease and with greater rapidity than the corresponding acrylic or methacrylic esters. For example, it has been found that allyl α-chloracrylate may be polymerized by simple heating without the use of catalysts. When heated at 80° C. in the presence of a catalyst, such as benzoyl peroxide, polymerization sets in almost immediately, and in a short time, the materials set to a very hard, colorless mass which is, in general, infusible and insoluble. Other suitable catalysts which increase the rate of polymerization and reduce the induction period include oxygen, sunlight and ultraviolet light, and benzoyl, acetyl and hydrogen peroxides, ozonides or other oxygen liberating substances.

The polymerization reaction is fairly vigorous and exothermic and may cause the formation of bubbles occasionally with discoloration. However, this bubble formation may be avoided by convenient methods, such as by maintaining the temperature below that of bubble-formation (preferably at about 80° C.) by suitable cooling devices. In this way, a resin product may be formed which is uniformly transparent, clear and colorless. Bubble formation may also be avoided by other methods such as by using super-atmospheric pressures, in which case a less accurate control of temperature may be permissible.

The polymers of the ester herein described are very clear, transparent resins which are less inflammable than the corresponding polyacrylates or polymethacrylates and which are free from odor or taste.

In view of the insolubility and infusibility of the polymers in their final state of polymerization the polymers cannot be molded. Accordingly, when shaped products are desired it is necessary to cast polymerize the product or to prepare a fusible intermediate polymer which may be molded to a desired form. Often it is difficult to cast polymerize these materials since considerable shrinkage occurs and the final products may be fractured to an objectionable degree unless polymerization is carried on slowly under carefully controlled conditions.

Upon heating the unsaturated esters of chloracrylic acid to polymerize the same, it has been found that unless precautions are taken to avoid it the product sets up into a gel at an early stage of the polymerization. In general, this gel is practically insoluble in organic solvents and may often be substantially infusible. It is a mixture containing a quantity of polymer and a large quantity of unpolymerized monomer. I have found that a fusible polymer may be obtained by interrupting polymerization before the polymer is converted to an insoluble or infusible gel. This product is soluble in a majority of solvents in which acrylate polymers normally are soluble and may be molded to a convenient form and rendered infusible by further polymerization in suitable manner, for example, by application of heat, light, or other sources of energy with or without catalysts. The fusible polymer may be prepared, for example by polymerization of the esters in solvents which are capable of dissolving the fusible polymer, and interrupting polymerization before the infusible insoluble polymer is formed.

In general, it has been found that the solvents, in which polymers of the saturated esters of the acrylates or alpha-substituted acrylates, such as methyl methacrylate, methyl chloracrylate, etc., are soluble, should be used for this purpose. Thus, such solvents as acetone, dioxane, chloroform, toluene, benzene, carbon tetrachloride, methyl cellosolve acetate, phenyl cellosolve, dichloroethyl ether, xylene, tetralin, dibutyl phthalate, etc., are found to be suitable. In addition, the saturated acrylic or alpha-substituted acrylic esters such as monomeric methyl, ethyl, propyl, etc., methacrylate or chloracrylate, or other polymerizable materials, for example, "vinylic" compounds, such as styrene, vinyl chloride, vinyl acetate, etc., may be added to the above solution before polymerization in order to form copolymers. Since such materials, particularly vinyl acetate, vinyl chloride, styrene, etc., dissolve substantial amounts of the fusible polymers, they may be used themselves as solvents.

In each case, the polymerization should be interrupted before the infusible product is produced. Since the polymer apparently becomes infusible whenever interpolymerization of the acrylate groups with the unsaturated alcoholic groups occurs, polymerization should be interrupted before this phenomenon occurs to too great an extent. This may be accomplished by stopping polymerization before gel formation is observed. In accordance with one illustrative method of interrupting polymerization, the polymer may be separated from the solvent by convenient methods, for example, by the addition of a compound in which acrylate polymers are normally insoluble, such as methyl or ethyl alcohol, petroleum ether, water, ethylene glycol, etc., or by removal of all or a portion of monomer by distillation or by solvent extraction. This process permits the isolation of the fusible polymer of the unsaturated alcohol chloracrylic ester in a substantially pure state.

Polymerization may also be halted by lowering the temperature of the reaction mixture to a suitable degree, for example, to room temperature or below. It has been found that although polymerization proceeds fairly rapidly at temperatures of 35–40° C., or above, the reaction rate increasing with increase of temperature, it proceeds at such a slow rate that it may be practically discontinued at lower temperature. This is especially true when polymerization is carried out in solution.

In accordance with another effective method of interrupting polymerization, inhibitors, such as pyrogallol, hydroquinone, aniline, phenylene diamine, sulphur, thiophenol, organic or inorganic salts or complexes of the reduced forms of metals such as copper, manganese, cobalt, nickel, etc., dipentene, etc., may be added to the polymer during polymerization or before polymerization has been initiated. In this manner, solutions of the fusible polymer may be secured. These solutions may be treated to remove the solvent by slow evaporation, treatment with a nonsolvent, or other suitable method and fusible cast thermoplastic polymers which may be machined, cut, bent or otherwise worked into desirable forms thereby obtained. After final shaping, the products may be completely hardened and rendered infusible by suitable methods hereinafter more fully set forth.

It has been found that the yield of fusible polymer appears to be dependent to a great extent upon the concentration of the monomer in the solution undergoing polymerization. Thus, when very concentrated solutions containing a large quantity, for example, in excess of 40-50 percent, of the monomeric allyl or methallyl chloracrylate, are subjected to conditions of polymerization, the amount of fusible polymer which may be secured prior to gel formation is very low, often not in excess of 5 percent by weight of the theoretical yield. Conversely, when solutions containing somewhat lower concentrations of monomer, for example, up to 30 percent by weight, yields of the fusible polymer upward of 50 percent of the theoretical may be secured. Accordingly, it is preferred to deal with solutions having a monomer concentration below 40 percent by weight.

The yield of fusible polymer appears to be increased by treating the solutions at increased temperatures and increased catalyst concentrations. Thus, substantially greater yields may be secured by polymerizing allyl chloracrylate solutions at 100° C. or above than may be secured at 60° C. Catalyst concentrations up to 5 percent or more may be used in some cases. In general, conditions favoring the formation of lower molecular weight polymers appear to result in increased yields of fusible products.

The fusible polymers so produced have many characteristics which are similar to those of the polymers formed from the saturated acrylic acid esters. They are soluble in such organic solvents as acetone, dioxane, chloroform, ethyl cellosolve acetate, triacetin, phenyl cellosolve, etc., and soften upon heating. The exact softening points of the products are dependent to a great degree upon the temperature, catalyst concentration and monomer concentration of the solution undergoing polymerization. In general, it is found that the chloracrylic esters soften at a temperature somewhat higher than the corresponding acrylic and methacrylic esters and at normal temperatures are somewhat harder and more dense. All of these products appear to be easily molded into convenient shapes.

In accordance with my invention, I have found that upon subjection of these polymers to heating at temperatures somewhat above the softening point thereof, for a sufficient period of time, they are converted into infusible, insoluble, transparent hard and wear-resistant products. This conversion appears to occur in the absence of catalysts. It may be assisted, however, by the incorporation of usual polymerization catalysts, such as oxygen, ozone, air, peroxides such as hydrogen peroxide, or acetyl peroxide, basic or acidic catalysts, light, etc. By use of catalysts, it is found that the conversion of these products to the infusible state may be secured at lower temperatures. The application of superatmospheric pressure has been found to assist the transformation to the insoluble and infusible stage.

The properties of the products so produced are dependent to a degree upon the conditions under which they were rendered infusible. Thus, extremely hard, somewhat brittle products may be prepared by effecting the treatment at relatively high temperatures or under high pressures. On the other hand, somewhat stronger, less brittle materials may be secured when the treatment is carried under moderate pressures and temperatures sufficiently low to permit a slow conversion of the fusible polymer into its insfusible stage through a period in which it is substantially completely molten.

By operation in accordance with the present invention, it is thus possible to form a molded article from the fusible polymer such as the fusible polymeric allyl or methallyl chloracrylate previously referred to, and thereafter to render the molded product insoluble and infusible by heat. In this manner, I am able to prepare transparent, hard, infusible molded products which have many of the desirable properties of the conventionally known thermoplastic resins. By proper regulation of the pressure and temperature, the fusible polymer may be extruded under such conditions that it becomes infusible as it leaves the extrusion die.

A large number of inert substances may be incorporated with the fusible polymer before subjecting to molding conditions. Suitable for such purposes are: fillers, such as wood-flour, mica, cotton flock, etc., plasticizers, such as dibutyl phthalate, dicyclohexyl phthalate, triacetin, tricresyl phosphate, natural and synthetic resins, pigments, including titanium dioxide, carbon black, chromic oxide, lead chromate, etc., and organic dye-stuffs such as methylene blue, methyl orange, etc.

If desired, similar products may be made from suitable polymers of the unsaturated esters of chloracrylic and with the saturated or unsaturated esters of the acrylic or alpha-substituted acrylic acids such as the methyl and ethyl esters thereof. In some cases, it is found that infusible products which are stronger and less brittle than the single polymer may be produced in this manner. This is particularly true when the allyl or other olefinic or acetylenic ester is polymerized with a saturated alcohol ester, such as the methyl or ethyl ester of chloracrylic acid.

The polymers which I have prepared are capable of numerous uses, such as in lacquers, or other coating compositions, molded articles, safety glass, etc. Where the composition is used for coating, it may be applied in solution or in solid form, either alone or in combination with natural or synthetic drying oils or resins and the like, the solvent removed and the coated article baked to render the surface infusible. In this manner, it is possible to surface other polymers which are less resistant to the action of solvents or of heat. When a coating of the fusible polymer of allylchloracrylate is deposited upon polymerized methyl methacrylate or similar polymer and the solvent removed, a coherent surface thereof is formed. Upon heating the coated article to suitable temperatures, this surface may be made transparent, hard and infusible.

Being of the thermosetting type, these resins do not exhibit the phenomenon of "cold flow," and are thus especially desirable for such uses as airplane windshields, where the pressure differences have been found to bow thermoplastic glass substitutes, particularly at the higher altitudes. Coating may also be applied to metal, glass, wood, synthetic resins, etc., surfaces by extrusion of the heated fusible polymer directly on the suitably-prepared surface. In similar manner, the surface may be heated and the polymer applied in powdered form, whereupon fusion occurs first to give a smooth, homogeneous film which may then be heat-hardened.

These resins are also suitable for many uses in the field of laminated products. For example, products of great strength, elasticity and adherence may be secured by converting fusible allyl or methallyl chloracrylate, etc., into the infusible state in the presence of a substantial amount of a compatible softening agent. Satisfactory non-shatterable glass sheets may be obtained by heating a combination of superposed sheets where the thermoplastic allylchloracrylate polymer and a softening agent such as dibutyl phthalate are used as the adhesive layer.

It has been found that these products are applicable for impregnation purposes. Thus, leather, paper, wood or other comparatively porous substances may be steeped in a solution of the fusible polymer of methallyl chloracrylate, for example, and then heated alone, under pressure, or in the presence of catalysts to convert the absorbed polymer to the insoluble, infusible form. Greatly improved products, particularly in regard to strength, water-proofing, and electrical properties are obtained.

These polymers are compatible with a large number of materials which may be incorporated therein. Products with a wide range of properties may be obtained by incorporating modifying agents either before, during, or after polymerization. For example, fillers, such as carbon black, wood flour, asbestos, china clay, etc. may be thus added to give opaque products. In a similar fashion, transparent or translucent materials may be obtained by incorporating substances which are soluble in the polymers such as plasticizing or softening agents, for example, phtholic esters, such as the methyl, ethyl, butyl, cyclohexyl, benzyl, or lauryl phthalates; similar esters of other dibasic acids such as succinic, fumaric, maleic, diphenic, adipic and tartaric acids; camphor; esters of polyhydric alcohols, such as glycol distearate, glycol dihexoate, triacetin, tributyrin, or glycol benzoate; ethers, esters, mixed ether-esters, or mixed ether-alcohols, such as anisole, hydroxyethyl ether, tetra-ethylene glycol monostearate, etc.; hydrocarbons, such as tetraphenyl ethane, dixylyl ethane, diphenyl and terphenyl, halogenated hydrocarbons such as chlorinated diphenyl, chlorinated napthalene, and the like; nondrying or semi-drying oils, such as castor oil, etc; inorganic esters, such as tributyl phosphate, triphenyl phosphate, and amides, such as p-toluenesulfonamide, tetraethyl phthalamide, and succinamide.

A great variety of color effects may be obtained by incorporating soluble or insoluble coloring matters therein. A large number of such materials lend themselves to application because of the inertness and neutrality of the resins themselves.

In accordance with a further modification of my invention, I may form conjoint polymers of a chloracrylic ester or other derivative of chloracrylic acid with other polymerizable materials, such as α-chloracrylic acid, esters, chlorides, amides, anhydrides, or nitriles of acrylic or methacrylic acid, vinyl chloride, vinyl acetate or other esters of vinyl alcohol, styrene, butadiene, β-chlorobutadiene, isoprene, polyhydric alcohol, polybasic acid reaction products such as glycerol phethalate, phenol-urea, or amine-aldehyde condensation products and the like. By treating a mixture of a chloracrylic acid derivative and one or more of these materials to secure polymerization, a product may be obtained having improved properties but which retains certain characteristics of the pure polymers. Thus, for example, by copolymerizing a mixture of allyl α-chloracrylate and methyl methacrylate, a colorless, transparent resin is obtained which has the higher softening point, degree of hardness, uninflammability and wear resistance characteristics of the allyl α-chloracrylate polymer and which has much of the flexibility and toughness of the polymeric methyl methacrylate.

The following examples illustrate the invention:

*Example IV*.—55 parts by weight of allyl chloracrylate were heated with 3 parts by weight of benzyl peroxide and 350 parts by weight of acetone at a temperature of 60° C. for 4 hours. At this time, 300 parts of methanol were added to produce turbidity, and the resulting mixture was poured slowly, with stirring, into 1600 parts of methanol. The white voluminous precipitate thus formed was filtered and dried, and was soluble in acetone and chloroform and softened at 110–125°

C. It was a highly plastic gum at 140–150° C. hardening with further heating.

*Example V.*—55 parts by weight of methallyl chloracrylate were heated with 3 parts by weight of benzoyl peroxide and 350 parts by weight of acetone at a temperature of 60° C. for 4 hours. At this time, 300 parts of methanol were added to produce turbidity, and the resulting mixture was poured slowly, with stirring, into 1600 parts of methanol. The white voluminous precipitate thus formed was filtered and dried and was soluble in acetone and chloroform. On heating it softened and then underwent conversion to a much harder, insoluble, clear product.

*Example VI.*—80 parts by weight of crotyl chloracrylate were heated with 3 parts by weight of benzoyl peroxide and 350 parts by weight of acetone at a temperature of 60° C. for 5 hours. At this time, 300 parts of methanol were added to produce turbidity, and the resulting mixture was poured slowly, with stirring, into 1600 parts of methanol. The white voluminous precipitate thus formed was filtered and dried, and was soluble in acetone and chloroform. On heating, it softened and then underwent conversion to a much harder, insoluble, clear product.

*Example VII.*—Two parts of fusible methallyl chloracrylate polymer, prepared as in Example V, was fused at 140–150° C., and then molded at 160–170° C. under pressure of 2000 lbs. per sq. in. for one hour. The product obtained was hard, clear, and unaffected by solvents or heat to the point of pyrolytic decomposition.

*Example VIII.*—Two parts of fusible crotyl chloracrylate polymer prepared as in Example VI was fused at 140–150° C., and then molded at 160–170° C. under pressure of 2000 lbs. per sq. in. for one hour. The product obtained was hard, clear, and unaffected by solvents or heat to the point of pyrolytic decomposition.

*Example IX.*—Two parts of fusible allyl chloracrylate polymer, prepared as in Example IV, was fused at 140–150° C., and then molded at 160–170° C. under pressure of 2000 lbs. per sq. in. for one hour. The product obtained was hard, clear, and unaffected by solvents or heat to the point of pyrolytic decomposition.

*Example X.*—A quantity of allyl alpha chloracrylate containing 3 percent of benzoyl peroxide was heated to 50° C. for one hour and a clear, hard, colorless product was obtained.

Although the present invention has been described in connection with the specific details of certain embodiments thereof, it is not intended that such details shall be regarded as limitations upon the scope of the invention, except insofar as included in the accompanying claims. This application is a continuation-in-part of my co-pending applications Serial No. 181,721, filed December 24, 1937, and Serial No. 226,310, filed August 23, 1938.

I claim:

1. Allyl alpha chloracrylate.
2. Methallyl alpha chloracrylate.
3. Crotyl alpha chloracrylate.
4. An unsaturated alcohol ester of alpha chloracrylic acid.
5. A polymer of an unsaturated alcohol ester of alpha chloracrylic acid.
6. A fusible heat-convertible polymer of an unsaturated alcohol ester of alpha chloroacrylic acid.
7. A polymer of allyl alpha chloracrylate.
8. A fusible heat-convertible polymer of allyl alpha chloracrylate.
9. A method of preparing a fusible polymer of an unsaturated alcohol ester of alpha chloracrylic acid which comprises treating said ester to polymerize the same and interrupting polymerization after substantial polymerization has occurred but before the polymer is converted into a gel.
10. A method of preparing a fusible polymer of an unsaturated alcohol ester of alpha chloracrylic acid which comprises treating said ester to polymerize the same, interrupting polymerization after substantial polymerization has occurred but before the polymer is converted into a gel and separating unpolymerized monomer from the fusible polymer.
11. A method of preparing a fusible polymer of an unsaturated alcohol ester of alpha chloracrylic acid which comprises treating said ester to polymerize the same, interrupting polymerization after substantial polymerization has occurred but before the polymer is converted into a gel and further polymerizing the fusible polymer to convert it to an infusible state.
12. A method of preparing a fusible polymer of an unsaturated alcohol ester of alpha chloracrylic acid which comprises treating a solution of said ester to polymerize the same and interrupting polymerization after substantial polymerization has occurred but before the polymer is converted into a gel.
13. A method of preparing a fusible polymer of allyl alpha chloracrylate which comprises treating said material to polymerize the same and interrupting polymerization after substantial polymerization has occurred but before the polymer is converted into an infusible gel.
14. A method of preparing a fusible polymer of allyl alpha chloracrylate which comprises treating a solution of said material to polymerize the same and interrupting polymerization after substantial polymerization has occurred but before the polymer is converted into an infusible gel.
15. A method of preparing a polymer of allyl alpha chloracrylate which comprises treating said material to polymerize the same and interrupting polymerization after substantial polymerization has occurred but before the polymer is converted into an infusible gel, and further polymerizing the fusible polymer to convert it to an infusible state.
16. A method of preparing an ester of alpha chloracrylic acid which comprises reacting an unsaturated alcohol with alpha chloracrylic acid.

MAXWELL A. POLLACK.